March 19, 1940.　　C. A. SAWTELLE　　2,193,985
BRAKE MECHANISM
Filed Dec. 27, 1937　　3 Sheets-Sheet 1

INVENTOR.
Charles A. Sawtelle
BY
ATTORNEYS

March 19, 1940.  C. A. SAWTELLE  2,193,985
BRAKE MECHANISM
Filed Dec. 27, 1937   3 Sheets-Sheet 2
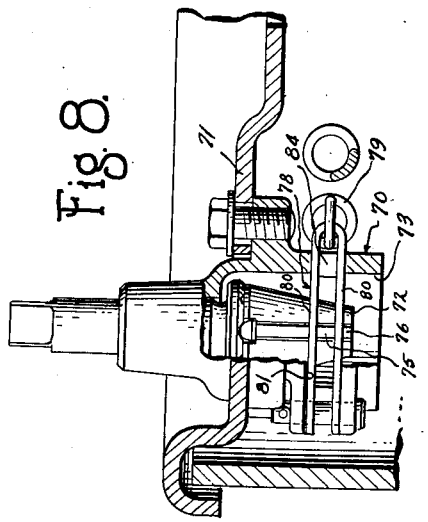
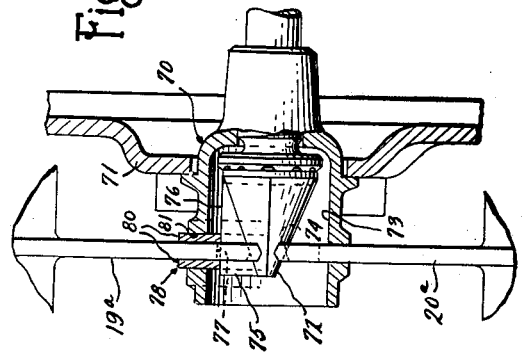
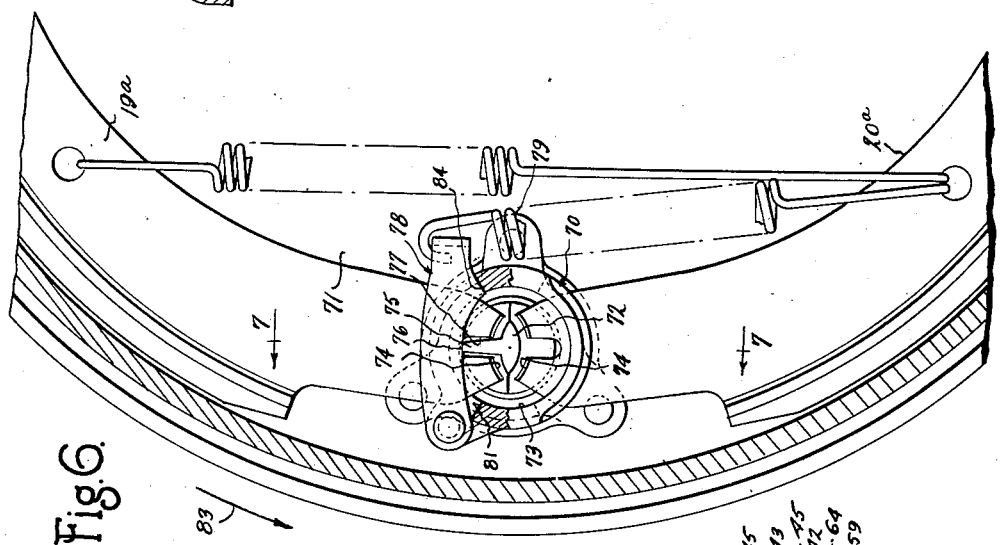
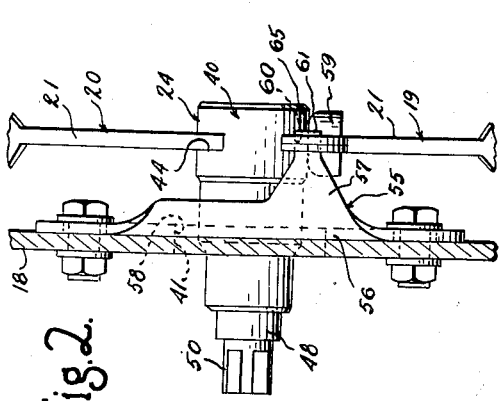
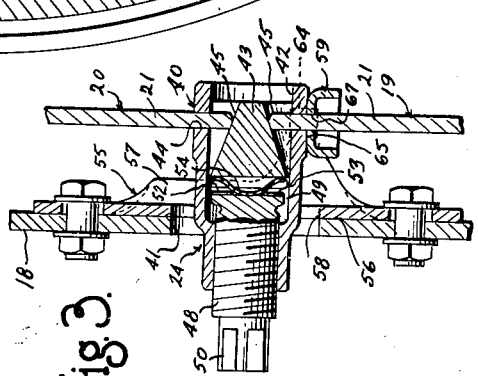
INVENTOR.
Charles A. Sawtelle
BY
ATTORNEY.s

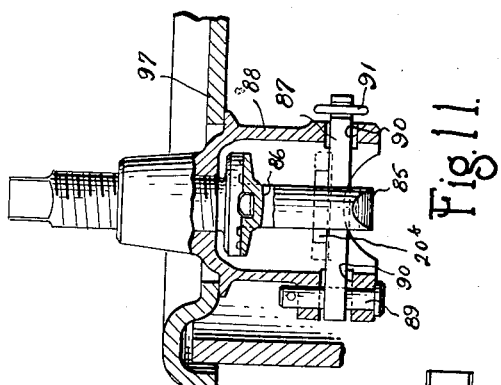
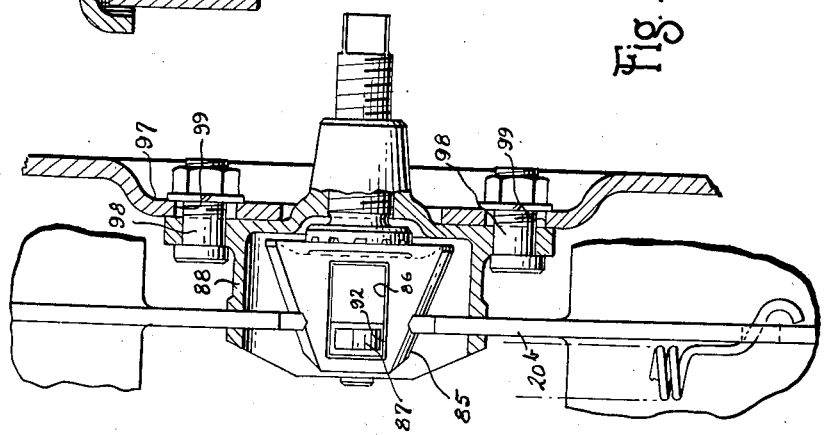
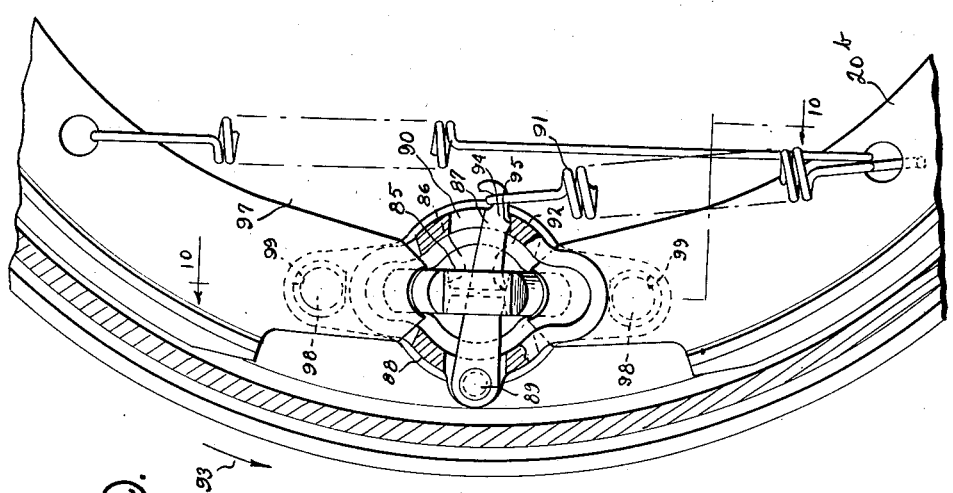

Patented Mar. 19, 1940

2,193,985

UNITED STATES PATENT OFFICE 2,193,985

BRAKE MECHANISM

Charles A. Sawtelle, Detroit, Mich., assignor to Kelsey-Hayes Wheel Company, Detroit, Mich., a corporation of Delaware Application December 27, 1937, Serial No. 181,909

18 Claims. (Cl. 188—78)

This invention relates generally to brake mechanisms and refers more particularly to improvements in brake constructions of the type employed in connection with the ground engaging wheels of motor vehicles.

It is one of the principal objects of this invention to provide a relatively simple centering device for the brake friction means which permits accurately centering the friction means within the brake drum at the time of assembly and maintains the friction means properly centered during use without the aid of separate adjustments.

Another advantageous feature of the present invention resides in the provision of centering means which functions to effectively center the brake friction means in an assembly wherein the friction means is permitted to shift circumferentially in both directions of rotation of the brake drum to provide servo in the forward, as well as the reverse direction of rotation of the drum.

A further object of this invention consists in the provision of brake mechanism having an adjustment device supported between the spaced ends of the friction means for varying the drum clearance and cooperating with the centering means to effectively center the friction means in the drum upon completion of each brake application.

The foregoing, as well as other objects, will be made more apparent as this description proceeds, especially when considered in connection with the accompanying drawings, wherein:

Figure 2 is a sectional view taken substantially on the plane indicated by the line 2—2 of Figure 1;

Figure 3 is a sectional view taken substantially on the plane indicated by the line 3—3 of Figure 1;

Figure 6 is a fragmentary elevational view, partly in section, of a brake mechanism showing a slightly modified form of adjustment device and centering means;

Figure 7 is a sectional view taken substantially on the plane indicated by the line 7—7 of Figure 6;

Figure 8 is a cross sectional view through the adjustment device having certain parts broken away for the sake of clearness;

Figure 9 is a fragmentary elevational view of a brake mechanism showing a further embodiment of this invention;

Figure 10 is a sectional view taken substantially on the plane indicated by the line 10—10 of Figure 9; and Figure 11 is a cross sectional view through the adjustment device having certain parts broken away for the sake of clearance.

Figure 1:
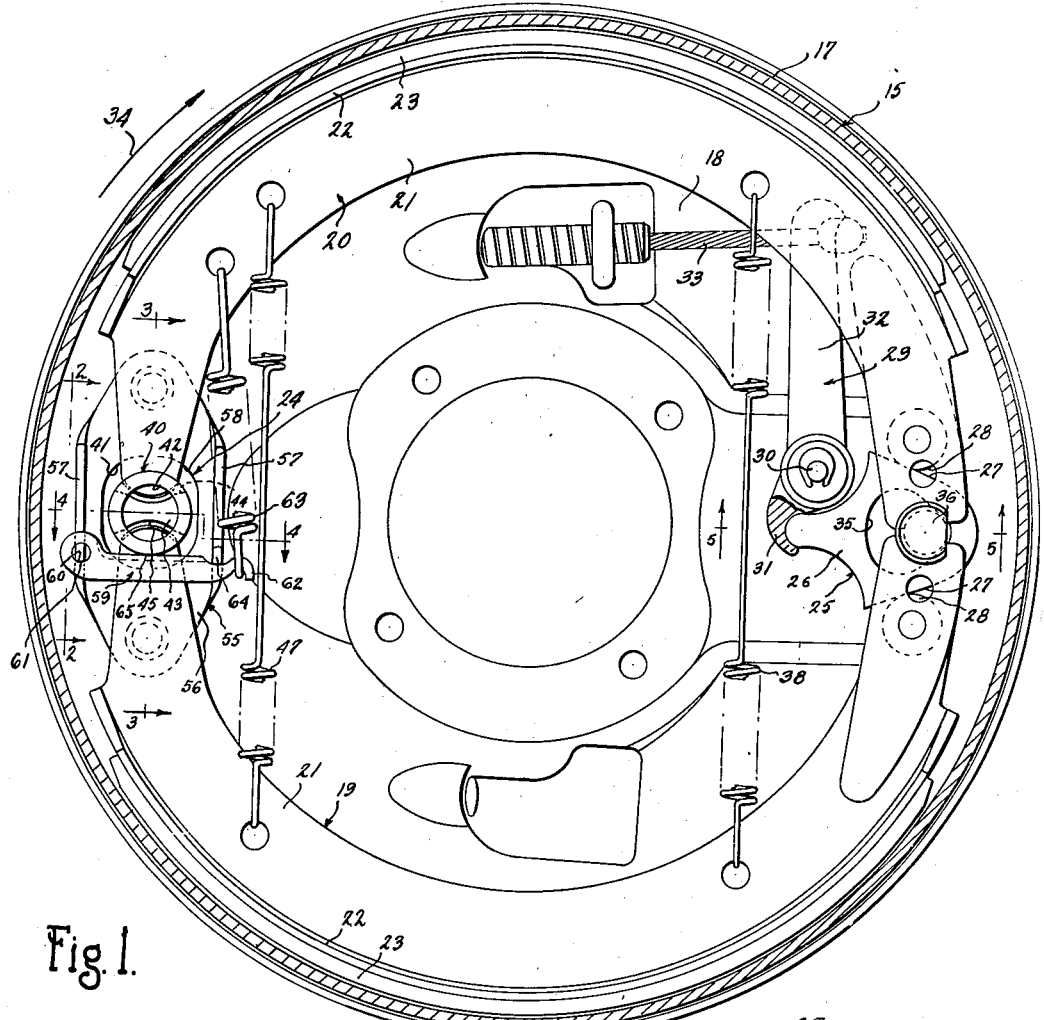
Figure 1 is an elevational view, partly in section, of brake mechanism constructed in accordance with this invention.
Figures 4, 5:
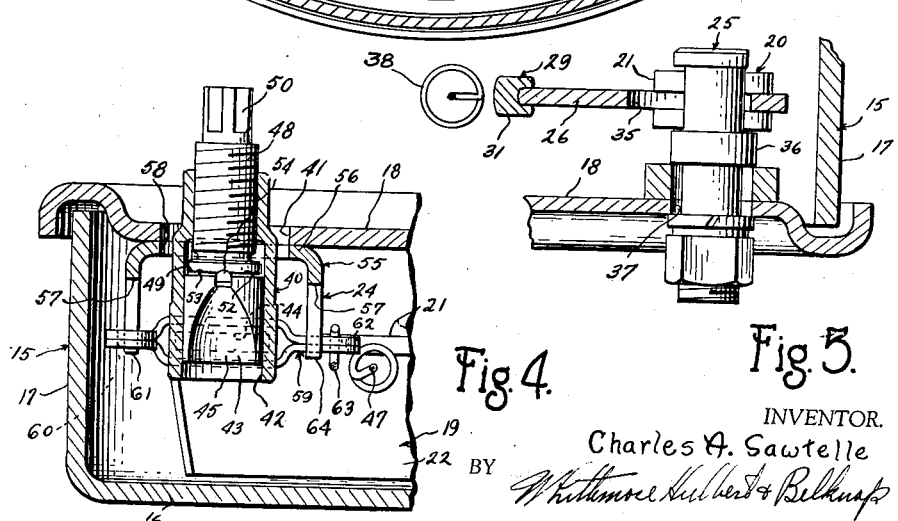
Figure 4 is a sectional view taken substantially on the plane indicated by the line 4—4 of Figure 1.
Figure 5 is a sectional view taken substantially on the plane indicated by the line 5—5 of Figure 1.

The brake mechanism selected herein for the purpose of illustrating the embodiment of the invention shown in Figures 1 to 5, inclusive, is provided with a brake drum 15 having a web portion 16 and having an annular brake flange 17 extending axially from the periphery of the web. In accordance with conventional practice, the open side of the drum is closed by a backing plate 18 fixed against rotation with the drum and forming a support for the brake friction means.

In the present instance, the brake friction means comprises a pair of shoes 19 and 20 substantially T-shaped in cross section. The shoes are supported on the backing plate 18 with the web portions 21 extending in a plane parallel to the plane of rotation of the drum and with the axially extending portions 22 located adjacent the inner surface of the annular brake flange 17. A suitable brake lining 23 having the desired coefficient of friction is secured to the outer surfaces of the axially extending portions 22 of the brake shoe so as to engage the inner surface of the brake flange 17 when the shoes are removed outwardly toward the brake flange.

Upon reference to Figure 1, it will be noted that the shoes are supported upon the backing plate 18 with the opposite ends of one shoe spaced from the adjacent ends of the other shoe circumferentially of the brake drum a sufficient distance to respectively receive therebetween an adjustment device 24 and an actuator 25. As will be more fully hereinafter set forth, both of the foregoing instrumentalities permit shifting movement of the shoes circumferentially of the drum relative to the backing plate in both directions of rotation of the drum in order to provide servo in both forward and reverse directions of rotation of the drum.

Although various different types of actuators may be employed for the purpose of moving the brake shoes outwardly about the adjustment device into engagement with the brake flange 17 of the brake drum, nevertheless, for the purpose of illustration, I have shown a relatively simple wedge type actuator for accomplishing this result. In detail, the actuator is provided with a wedge 26 supported on the backing plate between the ends of the brake shoes at one side of the drum for movement radially outwardly relative to the backing plate 18 and adjacent ends of the shoes. The opposite edges 27 of the wedge diverge inwardly and engage suitable rollers 28 carried by the adjacent ends of the shoes in any suitable manner. As a result, when the wedge is moved radially outwardly with respect to the adjacent ends of the shoes, the diverging edges 27 of the wedge engage the rollers 28 and swing the shoes outwardly toward the brake flange about the adjustment device 24. In the present instance, the wedge is moved radially outwardly by means of a lever 29 pivotally mounted adjacent one end thereof on the backing plate 18 by a stud 30 and having a relatively short arm 31 at one side of the pivot fashioned to engage the radially inner end portion of the wedge 26. As shown in Figure 1, the longer arm 32 of the lever is connected to the free end of a cable 33 extending through the backing plate 18 in a direction opposite the direction of forward rotation of the brake drum designated by the arrow 34 in Figure 1. The other end of the cable is connected to a suitable control (not shown) in such a manner that manipulation of the control imparts the desired radially outward movement of the wedge 26 relative to the adjacent ends of the shoes.

Upon reference to Figure 1 of the drawings, it will be noted that the wedge 26 is provided with an opening 35 therethrough for receiving a stud 36 secured to the backing plate 18 and projecting between the actuator ends of the shoes. The stud 36 forms an abutment for the actuator ends of the shoes in the released position of the latter and extends through a radial slot 37 in the backing plate 18 to provide for accurately locating the shoes with reference to the axis of the drum during assembly. In this connection, it is to be noted that the actuator ends of the shoes are normally yieldably maintained into abutting engagement with the stud 36 by means of the retraction spring 38 having the opposite ends respectively connected to the two shoes adjacent the actuator ends of the latter.

The opening 35 through which the stud 36 extends has a dimension circumferentially of the brake drum which is sufficiently greater than the diameter of the portion of the stud 36 extending therethrough to provide the clearance required for the wedge to shift relative to the stud circumferentially of the brake drum with the brake shoes when the latter are expanded into engagement with the brake flange in either direction of rotation of the brake drum.

The adjustment device 24 is supported between the ends of the shoes opposite the actuator ends of the latter and is for the purpose of varying the clearance between the brake linings 23 and the inner annular surface of the brake flange 17. Upon reference to Figures 1 to 4, inclusive, it will be noted that the adjustment device 24 is provided with a bracket 40 extending axially through an enlarged opening 41 in the backing plate 18 and having a longitudinally extending bore 42 within which a wedge 43 is supported for sliding movement transversely of the brake drum. The bracket 40 extends between the ends of the shoes opposite the actuator ends of the latter and the side walls of the bracket are slotted, as at 44, to permit the adjustment ends of the shoes to extend into the bore 42 of the bracket and engage the opposite sides of the wedge 43. The opposite sides of the wedge 43 are tapered from the rear end of the wedge toward the axis of the latter and are provided with transversely curved recesses 45 fashioned to engage the correspondingly curved extremities of the adjustment ends of the shoes. With this arrangement, it will be noted that movement of the wedge in a forward direction relative to the bracket causes the shoes to swing outwardly about the stud 36 between the actuator ends of the shoes to reduce the clearance between the friction linings 23 on the shoes and the brake flange 17. In this connection, it may be pointed out that the adjustment ends of the shoes are maintained into engagement with the bottoms of the recesses 45 in opposite sides of the wedge by means of a retraction spring 47 having the opposite ends respectively connected to the two shoes adjacent the adjustment ends of the latter.

The wedge 43 is adjusted relative to the bracket by means of a screw 48 threaded in the rear end of the bracket and having an enlarged portion 49 at the forward end thereof adapted to abut the rear face of the wedge. The head 50 of the screw is shaped for engagement with a suitable wrench and extends a sufficient distance rearwardly from the backing plate to permit the same to be conveniently manipulated.

It will, of course, be understood from the foregoing that the wedge is prevented from rotation relative to the bracket by means of the engagement of the extremities of the shoes in the recesses 45 on opposite sides of the wedge, and provision is made herein to prevent accidental rotation of the screw so that the desired adjustment will be maintained until the screw 48 is manipulated. In the present instance, the front face of the enlargement 49 is provided with a plurality of angularly spaced projections 52 forming recesses 53, and the rear face of the wedge is recessed to receive a spring pressed detent 54. The detent 54 engages in one of the recesses 53 to hold the screw in any one of its several adjusted positions and, in addition, cooperates with the projections 52 to indicate predetermined increments of adjustment. The adjustment is accomplished by threading the screw 48 in the bracket until the wedge 43 is moved forwardly a sufficient distance to engage the brake linings 23 on the shoes with the brake flange 17. The screw is then backed off the number of increments required to secure the desired clearance between the brake flange 17 and the brake linings 23 on the shoes.

It has previously been stated that the bracket 40 extends through an enlarged opening 41 in the backing plate 18 and the dimension of this opening is sufficiently greater than the diameter of the portion of the bracket extending therethrough to permit the required circumferential shifting movement of the bracket with the brake shoes in both directions of rotation of the drum to secure the desired servo action.

Inasmuch as the brake shoes may shift in either direction of rotation of the brake drum, it follows that in the released position of the shoes, the latter must be supported in a position wherein the bracket 40 is centered in the enlarged opening 41. In the present instance, the shoes are accurately centered in the brake drum upon the completion of each brake application by means of a centering device 55. The centering device is provided with a plate 56 secured to the backing plate 18 within the drum and having forwardly projecting flanges 57 positioned at the radially inner and outer sides of the adjustment device. It will be observed from Figures 1 and 4 that the plate 56 is fashioned with an opening 58 in registration with the opening 41 and corresponding in size to the latter opening. Thus, it will be seen that the plate 56 does not interfere with shifting movement of the adjustment device with the brake shoes circumferentially of the drum in either direction of rotation of the brake drum.

Upon reference to Figure 1, it will be noted that the centering device 55 also includes a lever 59 having an opening 60 in the outer end for receiving a forwardly extending projection 61 on the radially outer flange 57 of the plate 56 and having a hook 62 at the radially inner end providing a connection with one end of a spring 63 having the opposite end connected to the secondary shoe 20. The spring 63 tends to swing the lever 59 about its pivot 61 in a direction toward the secondary shoe and the extent of swinging movement is limited by means of a stop 64 in the form of a projection extending forwardly from the radially inner flange 57 of the plate 56. Referring again to Figure 1, it will be noted that the portion of the lever between its pivot 61 and the stop 64 engages the side of the adjustment bracket 40 adjacent the adjustment end of the primary shoe 19 and this point of engagement is designated herein by the reference character 65. The stop or abutment 64 for the free end of the lever 59 is predeterminedly positioned with respect to the brake shoes in the released position thereof so that the brake mechanism is accurately centered when the free end of the lever is abutting the stop 64 under the influence of the spring 63.

In order to insure accurate centering of the brake friction means in the drum and at the same time prevent the centering means from interfering with actuation of the brake, the arrangement is such that the spring 63 exerts its force substantially in the plane of the web portions 21 of the shoes. In other words, the spring is supported so that the longitudinal axis thereof lies in the same radial plane as the web portions 21 of the shoes and this is accomplished by supporting the extremities of the lever 59 in the plane of the web portions 21 of the shoes. In the present instance, the lever 59 is shown as having the portion thereof intermediate the extremities channel-shaped with the flanges of the channel positioned on opposite sides of the primary shoe and with the base portion of the channel slotted, as at 67, to permit the adjustment end of the primary shoe to extend freely therethrough.

Assuming that the brake mechanism is in its centered position within the brake drum and that the latter is rotating in the direction of the arrow 34 of Figure 1, it will be noted that movement of the wedge 26 radially outwardly causes the shoes to move outwardly into engagement with the brake flange 17 about the adjustment device 24. As soon as the brake lining 23 on the primary shoe 19 engages the brake flange 17, the primary shoe tends to rotate with the drum in the direction of the arrow 34 and transfers torque to the secondary shoe 20. As pointed out above, this shifting movement of the shoes is permitted at both the actuator and adjustment ends. It follows, therefore, that the adjustment bracket 40 is moved by the primary shoe 19 in a direction away from the lever 59 toward the secondary shoe 20 to transfer the braking torque to the latter and to cause the lining 23 on the secondary shoe to effectively engage the brake flange. It will be noted from Figure 1 that shifting movement of the secondary shoe by the primary shoe in the direction of the arrow 34 tensions the spring 63 so that when the brake is released and retracted by the springs 38 and 47, the side wall 65 of the adjustment bracket 40 will engage the lever 59 and center the brake shoes in the drum.

When the brake mechanism is applied in the reverse direction of rotation of the brake drum, torque is transferred from the shoe 20 to the shoe 19 and the lever 59 is swung about its pivot 61 in a direction away from the stop 64 against the action of the spring 63. As a result, when the brake mechanism is released, the spring 63 returns the free end of the lever to its position in engagement with the stop 64 and since the intermediate portion of the lever contacts with the sides 65 of the adjustment bracket, it follows that the latter will also be returned to its center position by the spring 63. In this manner, the brake shoes are centered in the drum after each brake application, irrespective of the direction of rotation of the drum.

The embodiment of the invention illustrated in Figures 6 to 8, inclusive, differs from the one previously described in that the adjustment bracket 70 is fixed to the backing plate 71 against shifting movement with the brake shoes circumferentially of the drum and the wedge 72 is supported in the bore 73 of the bracket for shifting movement transversely of the bore with the brake shoes in either direction of rotation of the brake drum. In other words, the wedge 72 floats transversely of the bore 73 of the adjustment bracket 70 and serves to transfer the torque from the leading shoe to the trailing shoe.

In detail, the wedge 72 is generally frusto-conical in shape and the extremities of the adjustment ends of the shoes are recessed, as at 74, to frictionally engage the opposite sides of the wedge so that longitudinal movement of the wedge relative to the bore 73 effects an adjustment of the brake shoes in the manner previously set forth in connection with the first embodiment of this invention. The side of the wedge facing the primary shoe 19ª is provided with a laterally extending projection 75 forming an edge 76 which is substantially parallel to the axis of the wedge. Upon reference to Figure 6, it will be noted that the projection 75 is adapted to be freely received in a recess 77 formed in the adjacent end of the primary shoe 19ª. The straight edge 76 of the projection 75 cooperates with a swinging lever 78 to accurately center the brake shoes in the drum when the brake mechanism is released. As shown in Figure 6, the radially outer end of the lever 78 is pivoted to the adjustment bracket 70 and the radially inner end of the lever is engaged by one end of a spring 79 having the opposite end connected to the secondary shoe 20ª adjacent the adjustment end of the latter. The lever is shown in Figure 7 as being bifurcated with the furcations 80 receiving therebetween the end of the primary shoe and adapted to extend through an arcuate slot 81 formed in the side of the bracket 70 facing the primary shoe 19ª. As a result, a portion of the lever intermediate the ends thereof abuts the straight edge 76 of the projection 75 on the wedge 72 and the wedge is urged by the spring 79 in the direction of forward rotation of the drum indicated by the arrow 83 in Figure 6. The extent of movement of the wedge 72 in the direction of the arrow 73 by the spring 79 is limited by a shoulder 84 formed by the radially inner end of the slot 81 and accurately located to insure centering the wedge 72 and brake shoes in the brake drum when the brake mechanism is in its released position.

From the foregoing, it will be noted that when the shoes are shifted in the forward direction indicated by the arrow 83 in Figure 6, the wedge 72 shifts in a corresponding direction away from the lever 78 to transfer the torque of the primary shoe 19a to the secondary shoe 20a. The above movement of the wedge tensions the spring 79 so that when the brake mechanism is released, the wedge is returned to a position wherein the projection 75 abuts the lever 78. On the other hand, when the shoes are applied in the opposite direction of rotation of the drum, the wedge abuts the lever 78 and swings the latter about its pivotal connection with the adjustment bracket 73. This action also tensions the spring so that when the brake mechanism is released, the lever automatically returns the wedge to its center position shown in Figure 6 of the drawings. Thus, it will be observed that the operation is similar to the first described form of the invention and with the above noted exceptions, the construction may be identical to the one previously described.

The embodiment of the invention shown in Figures 9 to 11, inclusive, is similar to the one illustrated in Figures 6 to 8, inclusive, with the exception that the construction is such as to permit interchanging the wedge in right and left-hand brake assemblies. This is, of course, not true of the wedge 72 defined in connection with the embodiment of the invention shown in Figures 6 to 8, inclusive, because of the projection 75 on the side of the wedge facing the primary shoe 19a. However, in Figures 9 to 11, inclusive, the wedge 85 is substantially flat and has a central opening 86 extending radially therethrough for receiving the lever 87. The radially outer end of the lever 87 is pivoted to the adjustment bracket 88 by means of a pin 89 and the radially inner end of the lever extends through a slot 90 in the adjustment bracket 88 for connection with one end of the spring 91 having the opposite end connected to the secondary shoe 20b in the same manner as set forth in the above described form of the invention. The portion of the lever extending through the radial slot 86 in the wedge is adapted to engage the side 92 of the slot adjacent the adjustment end of the secondary shoe 20b so that the spring 91 tends to shift the wedge in the forward direction of rotation of the drum indicated by the reference character 93 in Figure 9. This action of the spring 91 is restricted by engagement of the radially inner end portion 94 on the lever with the shoulder 95 formed by the side of the slot 90 adjacent the adjustment end of the secondary shoe. The location of the shoulder 95 is accurately predetermined to center the wedge 85 and brake shoes in the drum when the brake mechanism is released. It will, of course, be noted from Figure 10 that the wedge 85 shifts with the brake shoes relative to the adjustment bracket 88 in the same manner as the wedge 72 previously described and the operation of the centering means set forth in connection with the embodiment of the invention shown in Figures 6 to 8, inclusive. Attention may be called to the fact at this time that the adjustment bracket 88 is secured to the backing plate 97 by means of fastener elements 98 extending through enlarged openings 99 in the backing plate. These openings permit accurately locating the adjustment bracket relative to the backing plate during assembly.

While in describing the present invention several embodiments have been shown for the purpose of illustration, nevertheless, it will be noted that in each modification provision is made for accurately centering the brake friction means in the brake drum upon completion of each brake application. It will also be noted that in each embodiment, the centering means cooperates with the adjustment means for the brake shoes to accurately center the friction means in a construction wherein the shoes, as well as a part of the adjustment mechanism, shift circumferentially of the drum in either direction of rotation of the latter. In addition, it will be noted that each construction defined herein provides for exerting the centering force on the brake shoes substantially in the plane of the web portions of the shoes.

What I claim as my invention is:

1. In brake mechanism, a brake drum, brake friction means supported within said drum for shifting movement circumferentially of the drum and having spaced ends, a member supported between said ends for shifting movement with the friction means and engageable with said ends, an abutment engageable with one side of the member to center the latter in the drum and movable with said member in one direction of rotation of the drum, and a spring connecting the abutment with one of the end portions of the friction means to resist movement of the abutment by said member from the center position of the latter and to maintain the side aforesaid of the member into engagement with the abutment.

2. In brake mechanism, a brake drum, brake friction means supported within said drum for shifting movement circumferentially of the drum in opposite directions and having spaced ends, means for adjusting the friction means relative to the drum including a member movable transversely of the drum between the ends of the friction means and engageable with said ends, means supporting said member for shifting movement with the friction means in opposite directions, an abutment engaged by one side of the adjusting means to center the latter in the drum and movable by the adjusting means in one direction, and a spring connecting said abutment with the end of the friction means engaging the opposite side of the adjusting means to resist movement of the abutment by said adjusting means.

3. In brake mechanism, a brake drum revoluble in a forward direction and in a reverse direction, brake shoes supported within said drum for shifting movement circumferentially of the drum in both directions and having the ends at one side of the drum spaced from each other, a member supported between said ends of the shoes for shifting movement with the shoes in both directions and engageable with said ends, means for centering the shoes within the drum including an abutment engageable with the side of the member adjacent the leading shoe in the forward direction of rotation of the drum and shiftable by said member circumferentially of the drum in the reverse direction of rotation of the latter, and a spring connecting said abutment with the end of the trailing shoe in the forward direction of rotation of the drum to resist said swinging movement of the abutment by said member.

4. In brake mechanism, a brake drum, brake friction means supported within said drum for shifting movement circumferentially of the drum and having spaced ends, a member supported between said ends for shifting movement with the friction means and engageable with said ends, a lever having one end pivoted for swinging movement in a plane parallel to the plane of rotation of the drum and having an intermediate portion abutting one side of the member, a fixed abutment engageable with the free end portion of the lever and cooperating with the latter to center the member in the drum, and a spring normally maintaining the lever into engagement with said abutment.

5. In brake mechanism, a brake drum revoluble in opposite directions, brake friction means supported within said drum for shifting movement circumferentially of the drum in both directions and having spaced ends, means for adjusting the friction means relative to the drum including a member movable transversely of the drum between the ends of the friction means and engageable with said ends, means supporting said member for shifting movement with the friction means circumferentially of the drum in both directions, a lever having one end pivoted for swinging movement in a plane parallel to the plane of rotation of the drum and having an intermediate portion engaged by one side of the adjusting means for movement by the adjusting means in one direction of rotation of the drum, a fixed abutment engaging the free end portion of the lever preventing swinging movement of the lever in the opposite direction, and a spring yieldably maintaining the free end portion of the lever into engagement with said abutment.

6. In brake mechanism, a brake drum, brake friction means supported within said drum for shifting movement circumferentially of the drum and having spaced ends, a member supported between said ends for shifting movement with the friction means and engageable with said ends, means for centering the friction means in the brake drum including a lever having one end pivoted for swinging movement in a plane parallel to the plane of rotation of the drum and having an intermediate portion engaged by one side of the member for swinging movement with the member in one direction of rotation of the drum, an abutment engaging the free end of the lever preventing swinging movement of said lever in the opposite direction, and a spring connected to the free end of the lever and to one of the ends of the friction means for yieldably maintaining the lever into engagement with the fixed abutment.

7. In brake mechanism, a brake drum, brake friction means supported within said drum for shifting movement circumferentially of the drum and having spaced ends located in a plane parallel to the plane of rotation of the drum, means for adjusting the friction means relative to the drum including a member movable transversely of the drum between the ends of the friction means and engageable with said ends, means supporting said member for shifting movement with the friction means circumferentially of the drum, means for centering the friction means within the drum including a lever supported at one end for swinging movement in a plane parallel to the plane of rotation of the drum and having the free end located in the plane of the end portions of the friction means, said lever having an intermediate portion engaged by the adjusting means for movement with the latter circumferentially of the drum, an abutment engageable with the free end of the lever to prevent swinging movement of said lever in the opposite direction, and a spring connected to the free end of the lever and to one of the friction means for urging the lever into engagement with said abutment.

8. In brake mechansm, a brake drum, a backing plate for said drum, brake friction means supported on the backing plate within the drum for shifting movement circumferentially of the drum and having spaced ends, means for adjusting the friction means relative to the drum including a member movable transversely of the drum between the ends of the friction means and engageable with said ends, a bracket supporting said member and extending through an enlarged opening in the backing plate providing for shifting movement of the bracket relative to the backing plate with the friction means, means for centering the friction means within the drum including an abutment engaged by one side of the bracket and movable by the bracket in one direction of rotation of the brake drum, a stop engageable with the abutment preventing movement of the latter in opposite directions, and yieldable means normally urging said abutment into engagement with said stop.

9. In brake mechanism, a brake drum, brake friction means supported within said drum for shifting movement circumferentially of the drum and having spaced ends, means for adjusting the friction means relative to the drum including a wedge movable transversely of the drum between the ends of the friction means and engageable with said ends, means for supporting said wedge for shifting movement with the friction means circumferentially of the drum, an abutment engaged by one side of the wedge and movable in one direction of rotation of the drum by said wedge, a stop engaging said abutment to locate the latter in a position wherein the wedge is centered in the brake drum, and yieldable means normally urging the abutment into engagement with the stop.

10. In brake mechanism, a brake drum, brake friction means supported within said drum for shifting movement circumferentially of the drum and having spaced ends, an adjustment bracket supported between said ends and having slots in opposite side walls for freely receiving the ends of the friction means, a wedge movable longitudinally within the bracket with the opposite sides engaging said ends and shiftable relative to the bracket with the friction means circumferentially of the drum, a lever supported for swinging movement in a plane parallel to the plane of rotation of the drum and having an intermediate portion extending through the slot in one side wall of the bracket for engagement with the adjacent side of the wedge, an abutment engageable with the swinging end of the lever to locate the latter in a position wherein the wedge is centered in the bracket and the friction means is centered in the brake drum, and yieldable means normally urging said lever into engagement with the abutment.

11. In brake mechanism, a brake drum, brake friction means supported within said drum for shifting movement circumferentially of the drum and having spaced ends, a bracket supported between the ends of the friction means and having slots in opposite side walls thereof freely receiving said ends, a wedge movable longitudinally of the bracket with the opposite sides engaging the ends of the friction means and shiftable with the friction means relative to the bracket circumferentially of the drum, a lever having the radially outer end pivotally supported on the bracket for swinging movement in a plane parallel to the plane of rotation of the drum and having an intermediate portion extending through one of the slots in the bracket for engagement with the adjacent side of the wedge, and a spring having one end connected to the end of the friction means at the opposite side of the wedge and having the other end connected to the free end of the lever and urging the latter into engagement with the radially inner end wall of the slot aforesaid in the bracket.

12. In brake mechanism, a brake drum, brake friction means supported within said drum for shifting movement circumferentially of the drum and having spaced ends, means for adjusting the friction means relative to the drum including a wedge movable transversely of the drum between the ends of the friction means and engageable with said ends, means supporting the wedge for shifting movement with the friction means circumferentially of the drum, an abutment extending radially through the wedge and movable by the wedge in one direction of rotation of the drum, a stop engageable with the abutment preventing movement of the latter in the opposite direction and located to center the wedge in the brake drum, and yieldable means urging the abutment into engagement with said stop.

13. In brake mechanism, a brake drum, brake friction means supported within said drum for shifting movement circumferentially of the drum and having spaced ends, means for adjusting the friction means relative to the drum including a wedge movable transversely of the drum between the ends of the friction means and engageable with said ends, means supporting said wedge for shifting movement with the friction means circumferentially of the drum, a lever extending radially through an enlarged opening in the wedge having the radially outer end pivotally supported for swinging movement in a plane parallel to the plane of rotation of the drum and having an intermediate portion engageable with one side of the opening for movement by the wedge in one direction of rotation of the drum, an abutment engageable with the swinging end of the lever preventing movement of the lever in the opposite direction and located to center the wedge in the brake drum, and a spring having one end connected to the end of the friction means adjacent the side of the opening engaged by the lever and having the other end connected to the swinging end of the lever for normally maintaining the latter into engagement with the abutment.

14. In brake mechanism, a brake drum, brake friction means supported within said drum for shifting movement circumferentially of the drum and having spaced ends, a bracket supported between the ends of the friction means and having the opposite side walls slotted to freely receive said ends of the friction means, a wedge movable longitudinally of the bracket with the opposite sides engaging the ends of the friction means and shiftable with the friction means relative to the bracket circumferentially of the drum, a lever extending radially through an enlarged opening in the wedge having the radially outer end pivotally connected to the bracket and having an intermediate portion abutting one side of the opening through the wedge, the radially inner end of the lever extending through an enlarged opening in the radially inner side of the bracket and engageable with one side of the opening to center the friction means in the drum, and a spring having one end connected to the end of the shoe adjacent the side of the opening engaged by the lever and having the other end connected to the free end of the lever for maintaining said end into abutting engagement with the side aforesaid of the opening through the bracket.

15. In brake mechanism, a brake drum, brake friction means supported within said drum for shifting movement circumferentially of the drum and having spaced ends, a member supported between said ends for shifting movement with the friction means and engageable with said ends, a lever having one end pivoted to provide swinging movement of the lever in the direction of shifting movement aforesaid and having a portion intermediate the ends engageable with one side of the member for movement by said member in one direction of rotation of the drum, and spring means connected to the free end of the lever resisting movement of the member in the last mentioned direction of rotation of the drum.

16. In brake mechanism, a brake drum, brake friction means supported within said drum for shifting movement circumferentially of the drum and having spaced ends, adjustment means for the brake friction means including a member supported between the ends of the friction means for shifting movement with the latter and engageable with said ends, an abutment having one end pivoted for swinging movement in a plane substantially parallel to the plane of rotation of the drum and having an intermediate portion engageable with one side of the member, a stop positioned for engagement with the free end of the abutment and cooperating with the latter to center the member in the brake drum, and means for maintaining the free end of the abutment into engagement with the stop including a spring anchored on the end of the friction means opposite the end engaging the same side of the member as said abutment.

17. In brake mechanism, a brake drum, a backing plate for the drum, brake friction means supported within said drum on the backing plate for shifting movvement circumferentially of the drum in opposite directions and having spaced ends, a bracket secured to the backing plate between the ends of the friction means and having a bore extending transversely of the drum, a member movable longitudinally of the bore for adjusting the friction means relative to the drum and shiftable transversely of the bore in opposite directions with the friction means, means for centering the friction means in the drum comprising an abutment positioned for engagement by one side of the longitudinally adjustable member and movable in one direction generally circumferentially of the brake drum by said member, and a spring resisting movement of said member in the last named direction.

18. In brake mechanism, a brake drum, a backing plate for the drum, brake friction means supported on the backing plate within the drum for shifting movement circumferentially of the drum and having spaced ends, a bracket secured to the backing plate between the ends of the friction means and having a bore extending transversely of the drum, a member movable longitudinally of the bore for adjusting the friction means relative to the drum and shiftable transversely of the bore with the brake friction means, means for centering the friction means in the drum comprising an abutment positioned for engagement by one side of said member and movable in one direction generally circumferentially of the drum by said member, means on the bracket engageable with the abutment to prevent movement of the latter in the opposite direction and to locate said abutment in a position wherein the friction means is centered in the drum, and a spring normally holding the abutment in engagement with the means aforesaid on the bracket and resisting movement of the friction means in the first named direction.

CHARLES A. SAWTELLE.